United States Patent
Laabid et al.

(10) Patent No.: US 12,078,202 B2
(45) Date of Patent: Sep. 3, 2024

(54) TILTING PAD BEARING AND CORRESPONDING HOT OIL DRAINER

(71) Applicant: MIBA INDUSTRIAL BEARINGS GERMANY OSTERODE GMBH, Osterode (DE)

(72) Inventors: Abdelhakim Laabid, Göttingen (DE); Andreas Hein, Geisen (DE); Thilo Koch, Duderstadt (DE)

(73) Assignee: MIBA INDUSTRIAL BEARINGS GERMANY OSTERODE GMBH, Osterode (DE)

( * ) Notice: Subject to any disclaimer, the term of this patent is extended or adjusted under 35 U.S.C. 154(b) by 203 days.

(21) Appl. No.: 17/772,840

(22) PCT Filed: Oct. 14, 2020

(86) PCT No.: PCT/EP2020/078915
§ 371 (c)(1),
(2) Date: Apr. 28, 2022

(87) PCT Pub. No.: WO2021/083668
PCT Pub. Date: May 6, 2021

(65) Prior Publication Data
US 2022/0373021 A1   Nov. 24, 2022

(30) Foreign Application Priority Data

Oct. 30, 2019   (DE) .................... 10 2019 129 381.2
Jan. 27, 2020   (DE) .................... 10 2020 101 866.5

(51) Int. Cl.
F16C 17/03   (2006.01)
F16C 33/10   (2006.01)

(52) U.S. Cl.
CPC .......... *F16C 17/03* (2013.01); *F16C 33/1085* (2013.01)

(58) Field of Classification Search
CPC ....... F16C 17/03; F16C 33/1085; F16C 17/06
See application file for complete search history.

(56) References Cited

U.S. PATENT DOCUMENTS 4,291,926 A * 9/1981 Tomioka ................. F16C 17/03
384/311
5,738,447 A    4/1998 Nicholas

FOREIGN PATENT DOCUMENTS

| DE | 102011105762 A1 | 12/2012 | |
|---|---|---|---|
| JP | S58180815 A | 10/1983 | |
| JP | 2003113834 A | 4/2003 | |
| JP | 2010151283 A * | 7/2010 | .......... F16C 33/1045 |

OTHER PUBLICATIONS

Machine Translation of JP-2010151283-A (Year: 2010).*

* cited by examiner

*Primary Examiner* — Alan B Waits
(74) *Attorney, Agent, or Firm* — WC&F IP

(57) ABSTRACT

The invention relates to a tilting pad bearing for supporting a shaft having a longitudinal axis, the tilting pad bearing having —at least two tilting pads which are spaced apart from one another and each have a bearing surface and —at least one hot oil drainer which is arranged in an intermediate space between the at least two tilting pads, the at least one hot oil drainer being supported so as to be movable in the direction to and from the shaft.

13 Claims, 4 Drawing Sheets

TILTING PAD BEARING AND CORRESPONDING HOT OIL DRAINER

Figure 1:
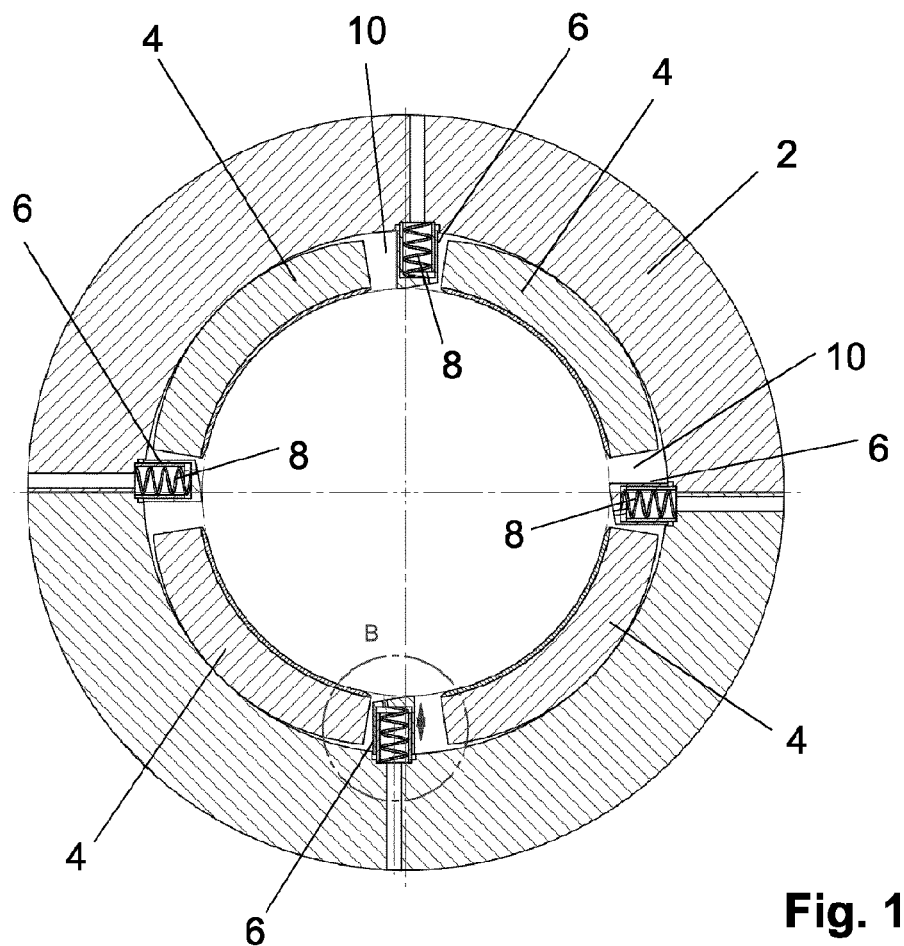

The invention relates to a tilting pad bearing for supporting a shaft with a longitudinal axis, the tilting pad bearing comprising at least two tilting pads spaced apart from each other, each of which has a bearing surface, and at least one hot oil drainer arranged in an intermediate space between the at least two tilting pads. The invention also relates to hot oil drainer for such a tilting pad bearing.

Such bearings have been known from the prior art for many years. They feature at least two tilting pads that are spaced apart from each other in the direction of rotation, each of which has a bearing surface. These tilting pads are mostly lubricated individually with an oil. This oil forms a film in the lubrication gap between the bearing surface of one of the tilting pads and the shaft to be supported. Due to the rotation of the shaft, the oil is conveyed through this lubrication gap. It is heated as a result, so that it leaves the lubrication gap warmer than when it entered.

A tilting pad bearing is usually intended for a specific direction of rotation of the shaft. However, there are also tilting pad bearings that can be used for both directions of shaft rotation. The present invention can be used for both versions of a tilting pad bearing. Each tilting pad has a front edge and a rear edge, which are also referred to as the leading edge and the trailing edge. The front or leading edge is the edge that is swept across crossed first by a point on the rotating shaft, while the trailing edge is the edge of the tilting segment that is swept across crossed last by a point on the shaft.

Tilting pad bearings are known, for example, from U.S. Pat. Nos. 5,738,447 A and 5,879,085 A.

It is known from U.S. Pat. No. 4,497,587 to supply lubricating oil in a separate component arranged between two adjacent tilting pads. This component has a dam at the front in the direction of rotation of the shaft, by means of which oil on the shaft is to be prevented from penetrating into the next lubrication gap of the adjacent tilting pad. A similar design is known from U.S. Pat. No. 5,738,447. Both components have a dam, by means of which oil on the shaft is to be prevented from penetrating into the respective next lubrication gap of the adjacent tilting pad. Behind this dam in the direction of rotation is an oil injection device through which fresh and in particular cool oil is injected into the respective lubrication gap. U.S. Pat. No. 5,288,153 discloses a tilting pad bearing that also features an additional separate component arranged between adjacent tilting pads. However, this component does not have a dam for removing adhering oil, but a plurality of oil injection nozzles through which fresh oil is sprayed at a high pressure onto the shaft to be supported. This should remove an oil film adhering to the shaft.

DE 10 2011 105 762 A1 also discloses a tilting pad bearing with an oil injection device arranged between adjacent tilting pads. It has a specially designed surface shape and contour to optimize the effect. This component is usually referred to as a hot oil drainer.

It is a disadvantage that the distance between a dam of the hot oil drainer and the shaft to be supported must be relatively large to be able to ensure that the dam of the hot oil drainer does not come into direct contact with the supported shaft, even during movements of the shaft relative to the tilting pad bearing and moving tilting pads. A safety distance must therefore be selected that is often considerably greater than the thickness of the oil film of the lubrication gap that develops between the shaft and the bearing surface of the individual tilting pads. As a result, only part of the hot oil adhering to the shaft can be drained.

The invention therefore aims to further develop a tilting pad bearing in such a way that more oil adhering to a shaft can be drained.

The invention solves the problem addressed by means of a tilting pad bearing which is characterized in that the at least one hot oil drainer is mounted such that it can be moved towards and away from the shaft. In this way, the hot oil drainer is brought into a position by external influences and forces, especially the hydraulic forces and properties of the oil surrounding and enclosing it, which enables an enhanced removal effect. The fact that the hot oil drainer can be moved towards and away from the shaft means that the hot oil drainer can be moved towards and away from the shaft over at least a certain range. This movement can be restricted in at least one of the two directions, but preferably in both directions, by an end stop, for example a mechanical end stop. If the hot oil drainer is resting on one of these end stops, it follows that a movement is only possible in one of the two directions, i.e. either towards or away from the shaft. This configuration is covered by the wording used here.

Preferably, the tilting pad bearing is an axial bearing and the at least one hot oil drainer can be moved in the axial direction. In this configuration, it can preferably be moved towards and away from a front face or an axial bearing surface of the shaft. Alternatively, the tilting pad bearing is a radial bearing and the at least one hot oil drainer can be moved in the radial direction.

Advantageous bearing arrangements feature at least one tilting pad bearing as described here that is designed as a radial bearing and at least one tilting pad bearing as described here that is designed as an axial bearing. Consequently, each of these tilting pad bearings has at least one hot oil drainer, wherein the at least one hot oil drainer of the radial bearing can be moved in the radial direction and the at least one hot oil drainer of the axial bearing can be moved in the axial direction.

The tilting pad bearing preferably comprises at least one force application element by means of which a force acting towards the shaft can be exerted on the at least one hot oil drainer. This force thus pushes the hot oil drainer towards the shaft to be supported. A balance of forces is achieved between this force exerted by the force application element and the force acting in the opposite direction, which develops due to the hydraulic properties and is to be referred to here as a hydraulic force. Due to the rotation of the shaft and the lubricating film that rotates with it and adheres to the shaft, and the oil moving through the lubrication gap, a hydraulic force acting away from the shaft is exerted on the at least one hot oil drainer. The closer the hot oil drainer is to the shaft, the greater this hydraulic force.

In this way, the distance between the surface of the hot oil drainer facing the shaft and the supported shaft can be reduced in relation to the embodiments from the prior art, so that more oil can be removed from the rotating shaft and drained out of the tilting pad bearing. In addition, heat is thus discharged out of the tilting pad bearing, so that in an otherwise identical configuration of the tilting pad bearing, higher rotation speeds of the shaft and/or higher loads are possible.

In a preferred embodiment, the tilting pad bearing has at least two force application elements by means of which the force can be applied to the hot oil drainer. The force can thus be applied more evenly and tilting movements, lateral accelerations or warping are prevented. The at least two force application elements are preferably arranged next to each other in the axial direction in the case of radial bearings and next to each other in the radial direction in the case of axial bearings, so that the force is applied at several points on the hot oil drainer.

Preferably, the at least one force application element features at least one mechanical element, especially a spring, especially preferably a compression spring, and/or at least one hydraulic element. The at least one force application element preferably has multiple mechanical elements which, as previously explained, are arranged next to each other in the axial direction, so that a force can be applied to the hot oil drainer at multiple points that are axially spaced apart from each other. If the at least one force application element features at least one hydraulic element, it is particularly easy to apply and adjust the force on the hot oil drainer. The oil which is to be applied anyway and which lubricates the tilting pad bearing can be used as hydraulic fluid. If the distance between the hot oil drainer and the shaft to be supported is to be reduced during operation, the compression force of the oil, which simultaneously constitutes the lubrication fluid, can preferably be reduced simply by adjusting the design, i.e. in particular the geometric shapes and contours. As a result, the balance of forces is shifted with the hydraulic force acting in the opposite direction to a position of the hot oil drainer further towards the shaft.

There is preferably at least one hot oil drainer between each adjacent tilting pad element, the tilting pad element comprising at least as many force application elements as hot oil drainers, by means of which a force acting radially inwards can be exerted on each hot oil drainer. Preferably, the same number of force application elements is provided for each hot oil drainer. If the various tilting pads are distributed equidistantly across the circumference, it is particularly easy to ensure that the same also applies for the hot oil drainers. The hot oil drainer is preferably not located centrally between the two adjacent tilting pads, but is shifted to the trailing tilting pad. This means that there is a larger intermediate space in front of the hot oil drainer in the direction of rotation than behind the hot oil drainer in the direction of rotation, so that the oil removed by the hot oil drainer can leave the tilting pad bearing particularly easily at this point, preferably in the axial direction in the case of axial bearings and in the radial direction in the case of radial bearings. The equidistant arrangement of the various hot oil drainers ensures that hot oil can be removed from the tilting pad bearing at as many points as possible, so that the oil temperature is as homogeneous as possible over the entire circumference.

The at least one hot oil drainer can preferably be moved along a guide, wherein the guide preferably prevents a movement of the hot oil drainer in the axial direction in the case of radial bearings and a movement of the hot oil drainer in the radial direction in the case of axial bearings. Particularly preferably, the guide does not prevent a movement of the at least one hot oil drainer in the direction of rotation. However, it may be advantageous for certain applications to also prevent a movement in the direction of rotation by means of the guide. The guide prevents forces from escaping the hot oil drainer that are not acting precisely towards or away from the shaft. In addition, an end stop can limit a maximum displacement of the hot oil drainer towards the shaft so as to ensure that there is no direct contact between the hot oil drainer and the shaft to be supported.

In a preferred embodiment, the at least one hot oil drainer is mounted such that it can be swivelled about a swivel axis that extends parallel to the longitudinal axis of the shaft. During operation of the tilting pad bearing, a rotating shaft is mounted radially, for example. Due to the movement and the resulting flow of oil, the individual tilting pads are tilted into the corresponding position for the respective movement and bearing situation. Active control is not necessary for this. Due to the corresponding bearing of the at least one hot oil drainer, the hot oil drainer can also be swivelled about a swivel axis that extends parallel to the longitudinal axis of the shaft and preferably also parallel to an axis about which the tilting pads can be tilted. In this case, the swivelling or tilting of the hot oil drainer also occurs due to the prevailing forces without the need for active control or movement.

Preferably, the at least one hot oil drainer has at least one dam and at least one oil injection device by means of which the oil can be sprayed onto a shaft supported in the tilting pad bearing. The dam preferably forms the most radially inward protruding part of the hot oil drainer. Consequently, it is the part that is closest to the shaft to be supported. The lubrication gap that forms between the hot oil drainer of the shaft is located between said dam and the shaft. Behind this in the direction of rotation is the oil injection device, by means of which fresh oil is injected. Due to its position in the "slipstream" of the dam, the fresh and in particular cool oil can be injected especially easily, upon which it is immediately transported by the rotating shaft and introduced into the subsequent lubrication gap. A wide variety of shapes and positions of a dam are known from the prior art. It is particularly advantageous if the dam has a leading tip or a leading part that is preferably located in the axial direction centrally on the hot oil drainer. In both axial directions, a part of the dam is attached to said tip/part, the former continuing to trail. As a result, oil removed from the shaft is simultaneously conveyed upwards where it can leave the tilting pad bearing.

In a preferred embodiment, the at least one hot oil drainer features at least two oil injection devices that are arranged on different sides of the at least one dam. In this way, the hot oil drainer is not restricted to one direction of rotation of the supported shaft, but can be used regardless of direction, so that one of the oil injection devices is always located behind the dam in the direction of rotation. The at least one hot oil drainer preferably has an oil injection device located in the centre of the dam. This also enables a hot oil drainer that can be used regardless of the direction of rotation of the supported shaft.

Preferably, the at least one hot oil drainer comprises at least two dams that are spaced apart from each other in the direction of rotation. One of the dams is consequently arranged closer to the leading edge and one is arranged closer to the trailing edge of the hot oil drainer. The at least one oil injection device is located between them. The oil injection device is thus arranged between the two dams, so that the hot oil drainer can be used regardless of the direction of rotation of the shaft to be supported.

The invention also solves the problem addressed by way of a hot oil drainer for a tilting pad bearing as described here.

In the following, some examples of embodiments of the present invention will be explained in more detail by way of the attached figures: They show FIG. 1—a sectional view through a tilting pad bearing according to a first example of an embodiment of the present invention, FIG. 2—an enlarged section from FIG. 1, FIG. 3—a sectional view through a tilting pad bearing according to a second example of an embodiment of the present invention, FIG. 4—an enlarged section from FIG. 3, FIGS. 5 to 10—further embodiments of a hot oil drainer.

FIG. 1 depicts a sectional view through a tilting pad bearing according to a first example of an embodiment of the present invention. It has a bearing housing 2 on which four tilting pads 4 are arranged. In the example of an embodiment shown, the tilting pad bearing is a radial bearing. Between two of the tilting pads 4 is a hot oil drainer 6 which, in the example of an embodiment shown, can be displaced radially inwards, i.e. towards the shaft that is not depicted here for the sake of clarity, by means of a spring 8, which constitutes a force application element in the example of an embodiment shown. It can be seen that the respective hot oil drainer 6 is not located centrally between the two adjacent tilting pads 4. Rather, there is a larger intermediate space 10 in front of the respective hot oil drainer 6 in the clockwise direction than behind the hot oil drainer 6 in the clockwise direction. The tilting pad bearing shown in FIGS. 1 and 2 is intended for a shaft that rotates in the clockwise direction.

Figure 2:
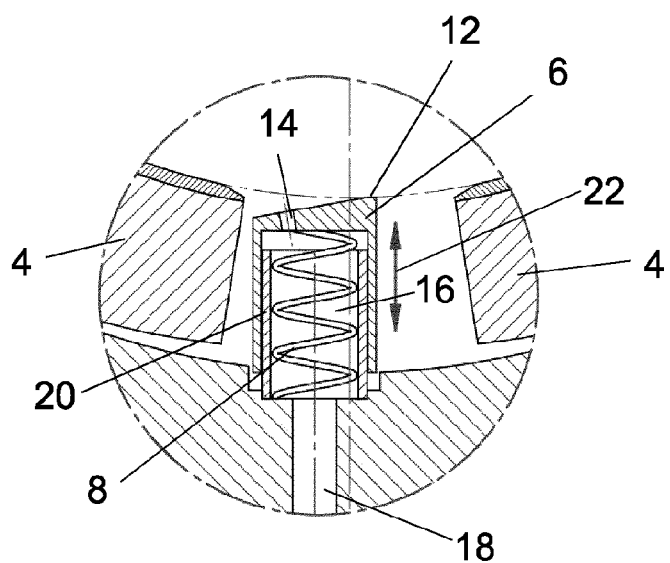

FIG. 2 shows an enlarged section from FIG. 1. One can see the hot oil drainer 6 with the spring 8 inside, which is arranged between the adjacent tilting pad bearings 4. The hot oil drainer 6 features a dam 12, which constitutes the leading edge in the example of an embodiment shown. The dam 12 forms part of the hot oil drainer 6, which protrudes the furthest radially inwards, i.e. towards the shaft to be supported, in the radial bearing shown. If the tilting pad bearing is designed as an axial bearing, the dam 12 protrudes in the axial direction, thereby forming the part of the hot oil drainer 6 that is closest to the shaft to be supported.

Trailing the dam 12, the hot oil drainer 6 features an oil injection device 14, which is connected to an interior space 16 of the hot oil drainer 6 and via said interior space to an oil supply line 18. The hot oil drainer 6 shown can be displaced along a guide 20 in the directions indicated by the double-arrow 22.

Figure 3:
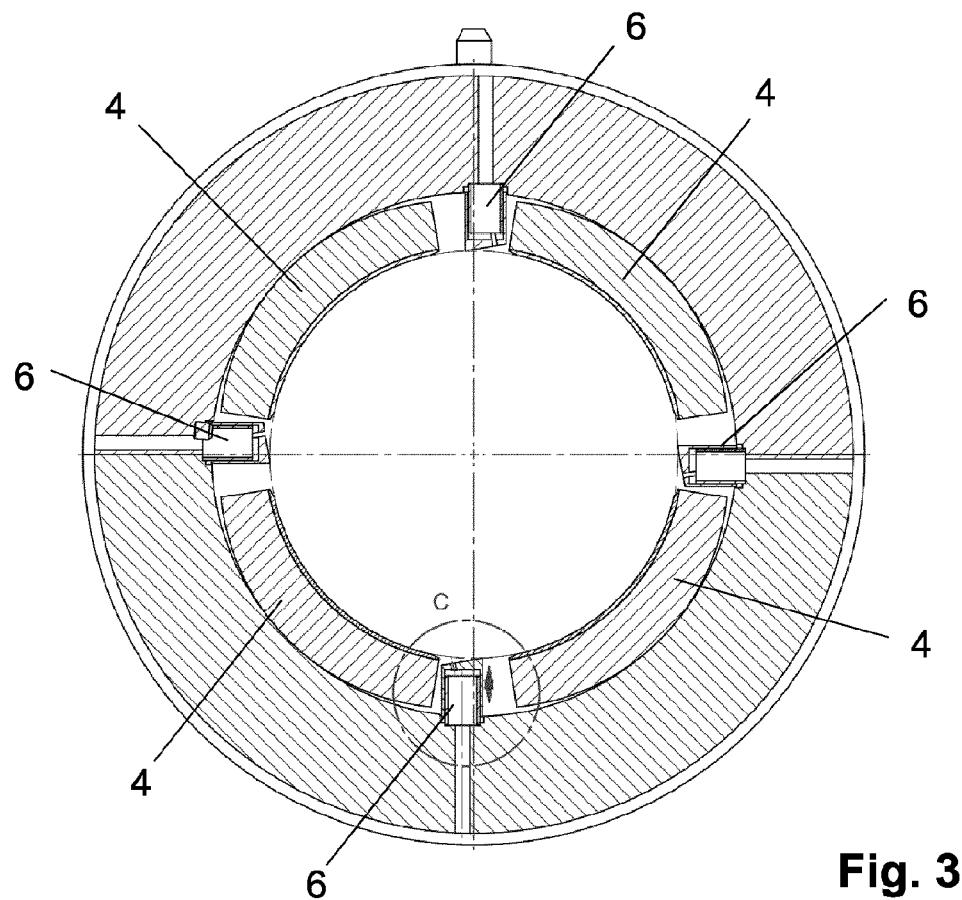

FIG. 3 shows a sectional view through a tilting pad bearing similar to FIG. 1. This bearing also has four tilting pads 4 between each of which a hot oil drainer 6 is located, which can now be subjected to a force hydraulically rather than by a mechanical force application element, for example the spring 8.

Figure 4:
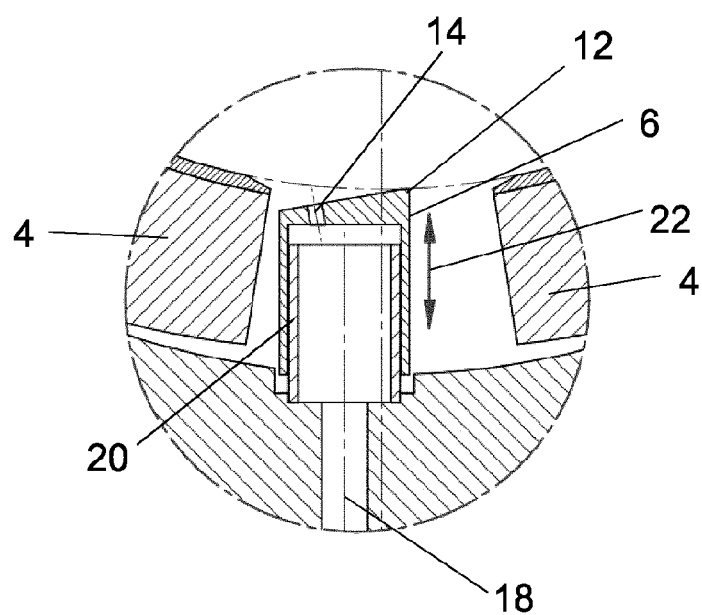

FIG. 4 depicts an enlarged section. Between the two tilting pads 4 is the hot oil drainer 6, which can be displaced along the guide 20 in the directions indicated by the double-arrow 22. The hot oil drainer 6 features the dam 12, which again constitutes the leading edge. The oil injection device 14 is shown trailing this edge. The hot oil drainer 6 is supplied with the necessary oil via the oil supply line 18, said oil now also applying the force to the hot oil drainer 6 in the form of hydraulic fluid.

Figure 5:
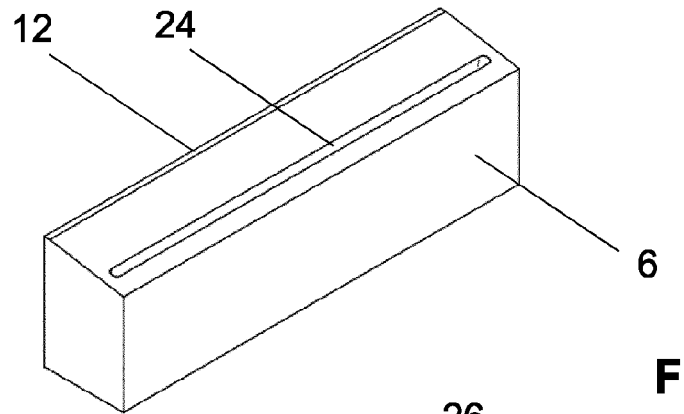
Figure 6:
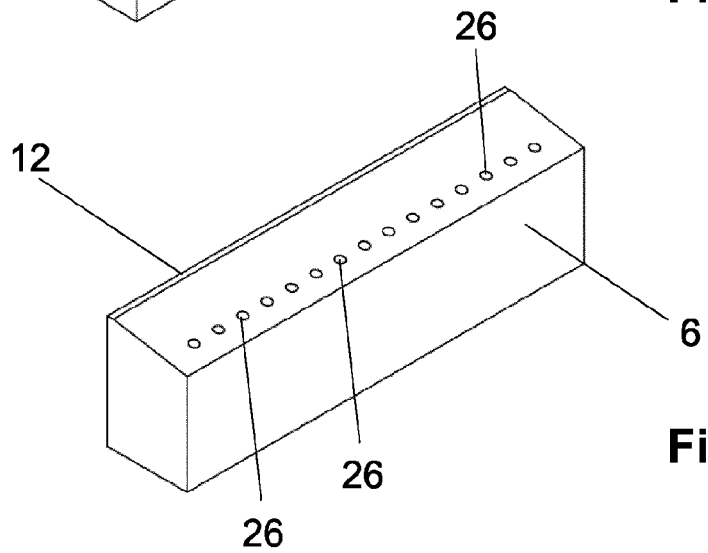
Figure 7:
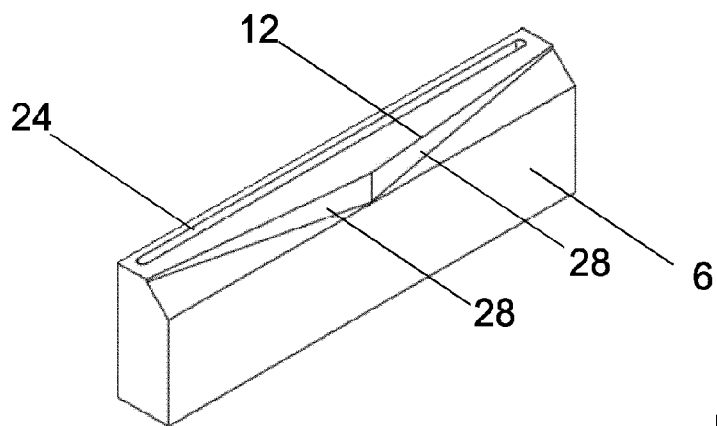

FIGS. 5 to 7 schematically depict a hot oil drainer 6. It features a dam 12, which in FIGS. 5 and 6 is located at the rear end of the hot oil drainer 6 shown. The hot oil drainer 6 depicted in FIG. 5 has a slit 24 that serves as an oil injection device 14. Conversely, the hot oil drainer 6 depicted in FIG. 6 shows a row of bores 26 that form the oil injection device 14.

FIG. 7 shows a different shape of the hot oil drainer 6. It also features the slit 24; however, in FIG. 7 it is located at the rear end of the hot oil drainer 6. The dam 12 is arranged at the front and has two flanks 28, which lend it a v-shape. Oil that is removed by this dam 12 from a shaft to be supported is thus moved in the axial direction and can easily leave the tilting pad bearing in this direction.

Figure 8:
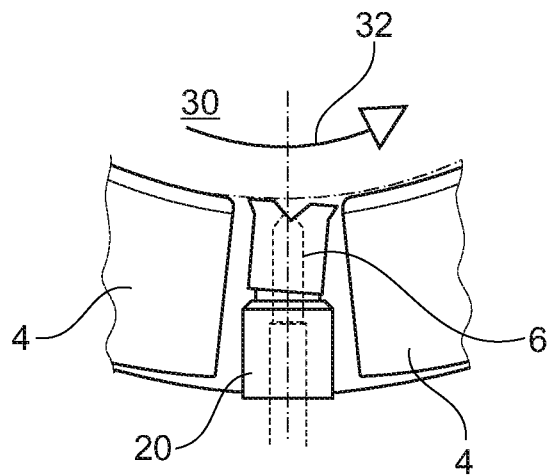
Figure 9:
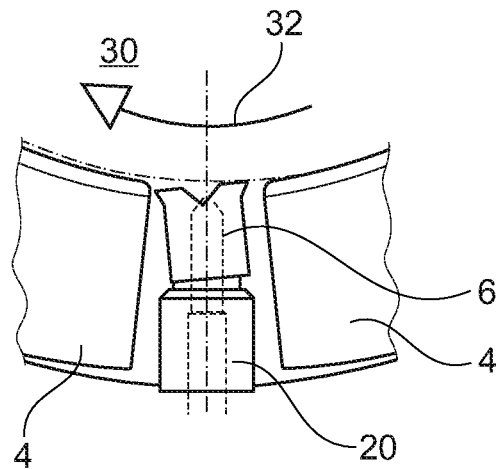

FIGS. 8 and 9 each depict a schematic side view of a hot oil drainer 6 between two tilting pads 4. A shaft 30 to be supported is schematically depicted above the tilting pads 4. The respective direction of rotation is shown by the arrow 32. The actual hot oil drainer 6 is mounted on a guide 20 such that it can be displaced, as is also the case in the embodiments shown in FIGS. 5 to 7. In addition, the hot oil drainer 6 can be tilted about an axis that is perpendicular to the drawing plane in FIGS. 8 and 9. In FIG. 8 it is clear that the hot oil drainer 6 is tilted to the right. This is largely achieved by the shaft 30 rotating in the anti-clockwise direction and the resulting flow of oil. In FIG. 9, however, the hot oil drainer is shown tilted to the left, as the shaft 30 is rotating in the clockwise direction.

Figure 10:
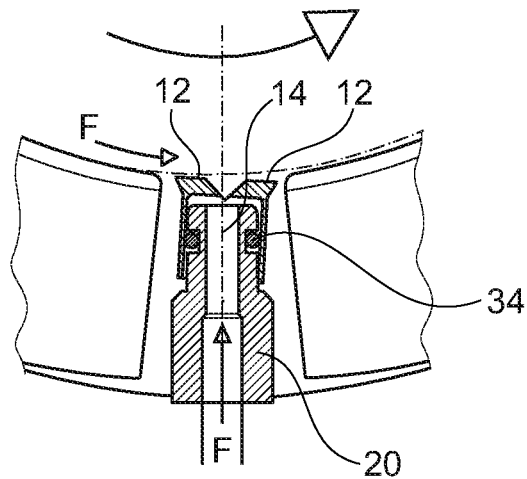

FIG. 10 shows a schematic section view through the hot oil drainer 6 as it is depicted in FIG. 8. A sealing ring 34 is located on the guide 20 on which the hot oil drainer 6 is arranged, said sealing ring coming into contact with an inner side of the hot oil drainer 6. In the example of an embodiment shown, it protrudes above the guide 20 and preferably forms the only point of contact with the hot oil drainer when the hot oil drainer 6 is not tilted. This renders tilting possible. It is limited up until the position in which the lower wheel of the hot oil drainer comes into contact with the guide 20.

On the side facing the shaft 20, the hot oil drainer has two dams 12 that are spaced apart from each other, between which an oil injection device is located. The hot oil drainer 6 can be used for both directions of rotation shown in FIGS. 8 and 9. It is subjected to two different forces, each of which is indicated in FIG. 10 by an "F". They refer to the force acting from below, i.e. radially, by means of the spring element or the hydraulic pressure of the oil, and the force acting in the direction of rotation by means of the rotation of the shaft 30 and the resulting flow of oil.

REFERENCE LIST 2 bearing housing
4 tilting pad
6 hot oil drainer
8 spring
10 intermediate space
12 dam
14 oil injection device
16 interior space
18 oil supply line
20 guide
22 double arrow
24 slit
26 bore
28 flank
30 shaft
32 arrow
34 sealing ring

The invention claimed is:

1. A tilting pad bearing for supporting a shaft with a longitudinal axis, comprising:
   at least two tilting pads spaced apart from each other, each of which has a bearing surface,
   at least one hot oil drainer which is arranged in an intermediate space between the at least two tilting pads, and
   at least one force application element for applying a force acting radially inwards on the at least one hot oil drainer,
wherein the at least one hot oil drainer is mounted such that it is moveable towards and away from the shaft, and
wherein the at least one hot oil drainer comprises at least one dam and at least one oil injection device for spraying oil onto the shaft supported in the tilting pad bearing, and wherein the at least one force application element comprises at least one hydraulic element which utilizes oil in the at least one hot oil drainer as a hydraulic fluid.

2. The tilting pad bearing according to claim 1, wherein the tilting pad bearing is a radial bearing and the at least one hot oil drainer is moveable in a radial direction.

3. The tilting pad bearing according to claim 1, wherein the at least one force application element for applying the force acting radially inward on the at least one hot oil drainer comprises at least two force application elements.

4. The tilting pad bearing according to claim 1 wherein the at least one force application element further comprises at least one mechanical element.

5. The tilting pad bearing according to claim 4 wherein the at least one mechanical element is a spring.

6. The tilting pad bearing according to claim 5 wherein the spring is a compression spring.

7. The tilting pad bearing according to claim 1 wherein the at least one hot oil drainer comprises a plurality of hot oil drainers and the at least two tilting pads comprises more than two tilting pads, wherein there is at least one hot oil drainer of the plurality of hot oil drainers between each adjacent tilting pad element of the more than two tilting pads, and wherein the tilting pad bearing comprises at least as many force application elements as hot oil drainers for applying a force acting radially inwards on each hot oil drainer.

8. The tilting pad bearing according to claim 1 wherein the at least one hot oil drainer is moveable along a guide.

9. The tilting pad bearing according to claim 8 wherein the guide prevents a movement of the at least one hot oil drainer in an axial direction and/or in a direction of rotation.

10. The tilting pad bearing according to claim 1 wherein the at least one hot oil drainer is configured to swivel a swivel axis.

11. The tilting pad bearing according to claim 1, wherein the at least one dam comprises at least two dams that are spaced apart from each other in a direction of rotation of the shaft, and wherein at least one of the oil injection devices is located between the at least two dams.

12. The tilting pad bearing according to claim 11, wherein the at least one oil injection device comprises at least two oil injection devices that are arranged on different sides of the at least one dam.

13. A hot oil drainer for a tilting pad bearing, comprising:
at least one dam;
at least one oil injection device for spraying oil onto a shaft supported in the tilting pad bearing,
wherein the hot oil drainer is configured to be arranged in an intermediate space between at least two tilting pads spaced apart from each other in the tilting pad bearing, and
wherein the hot oil drainer is configured to be mountable such that it is moveable towards and away from the shaft supported in the tilting pad bearing; and
at least one force application element comprising at least one hydraulic element which utilizes oil in the hot oil drainer as a hydraulic fluid.

* * * * *